US005587047A

United States Patent [19]
Bruggeman et al.

[11] Patent Number: 5,587,047
[45] **Date of Patent: *Dec. 24, 1996**

[54] METHOD FOR SEPARATING BORIC ACID

[75] Inventors: Aimé Bruggeman, Retie; Johan Braet, Nazareth, both of Belgium

[73] Assignee: Studiecentrum voor Kernenergie, Belgium

[ * ] Notice: The term of this patent shall not extend beyond the expiration date of Pat. No. 5,468,347.

[21] Appl. No.: 525,216

[22] Filed: Sep. 8, 1995

Related U.S. Application Data

[63] Continuation of Ser. No. 260,786, Jun. 16, 1994, Pat. No. 5,468,347.

[30] Foreign Application Priority Data

Jun. 16, 1993 [BE] Belgium .............................. 09300608

[51] Int. Cl.$^{6}$ .............................. B01D 1/00; B01D 3/38; G21F 9/08

[52] U.S. Cl. .................... 159/47.300; 159/29; 159/16.3; 159/DIG. 12; 159/DIG. 17; 203/49; 203/75; 203/76; 203/77; 203/78; 203/79; 203/80; 976/DIG. 381; 588/20

[58] Field of Search .......................... 159/47.3, 29, 16.3, 159/DIG. 12, DIG. 19, DIG. 39; 203/75, 76, 77–78, 79–80, 49 DIG. 6; 976/DIG. 381; 588/20; 376/308, 310

[56] References Cited

U.S. PATENT DOCUMENTS

| | | | |
|---|---|---|---|
| 3,679,751 | 7/1972 | Golden et al. | 423/283 |
| 3,839,159 | 10/1974 | Dunnavant et al. | 376/308 |
| 3,933,576 | 1/1976 | Rushton | 159/901 |
| 4,139,420 | 2/1979 | Stünkel | 203/10 |
| 4,435,184 | 3/1984 | Schroeder et al. | 423/283 |
| 4,476,048 | 10/1984 | Ambros et al. | 588/20 |
| 4,540,512 | 9/1985 | Lahoda | 423/278 |
| 4,800,042 | 9/1985 | Kurumada et al. | 423/158 |
| 4,902,446 | 2/1990 | Erbse et al. | 159/DIG. 12 |
| 5,096,624 | 3/1992 | Dörr et al. | 588/18 |
| 5,176,798 | 1/1993 | Rodden | 202/197 |

FOREIGN PATENT DOCUMENTS

| | | |
|---|---|---|
| 0125017 | 11/1984 | European Pat. Off. . |
| 2279205 | 2/1976 | France . |
| 2361791 | 6/1975 | Germany . |
| 1347779 | 8/1985 | U.S.S.R. . |

*Primary Examiner*—Virginia Manoharan
*Attorney, Agent, or Firm*—Bacon & Thomas

[57] ABSTRACT

A method for separating boric acid from a liquid, especially liquid waste obtained from a nuclear power plant. In the method, the waste solution containing the boric acid is contacted with steam in a reactor so that the boric acid evaporates from the liquid and passes into the steam vapor phase. Consequently, the radioactive wastes which are not evaporated with the steam remain in the waste water while the boric acid is removed from the waste water when it passes into the vapor or steam phase. The boric acid can then be separated and recovered from the steam by means of a distillation and fractionating column or a wash column. By removing the boric acid from the liquid waste, it is possible to obtain concentrated radioactive waste having a reduced volume due to the absence of boric acid in the waste.

17 Claims, 1 Drawing Sheet

Fig. 1
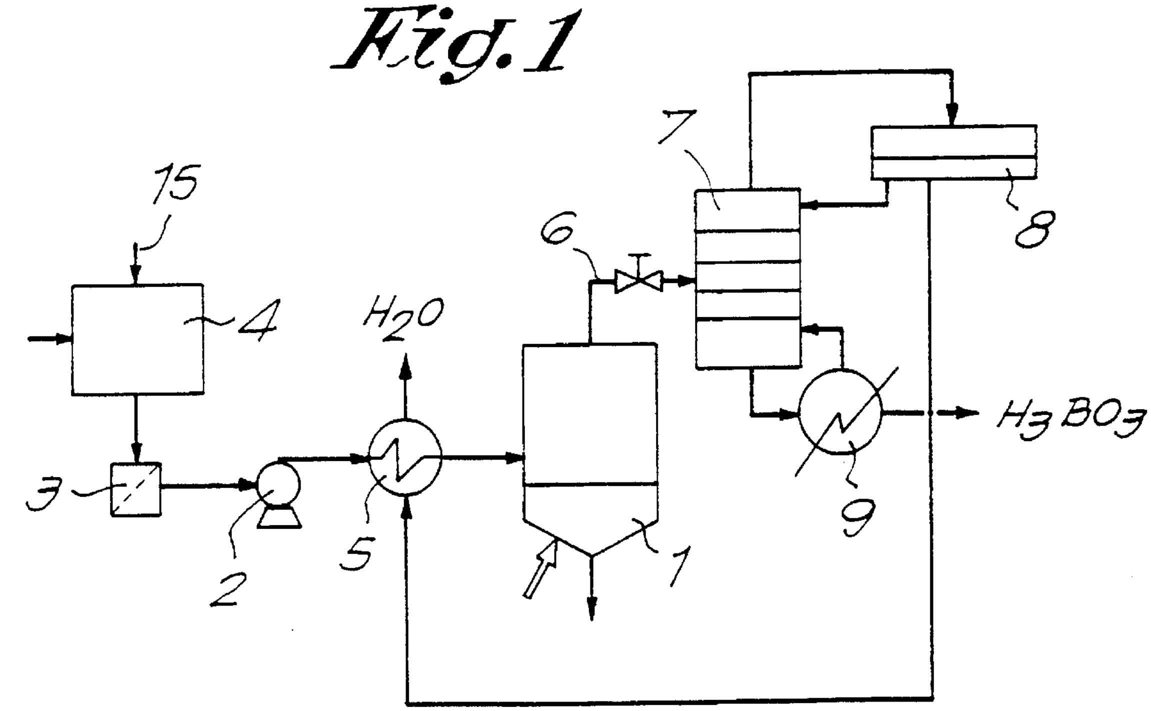
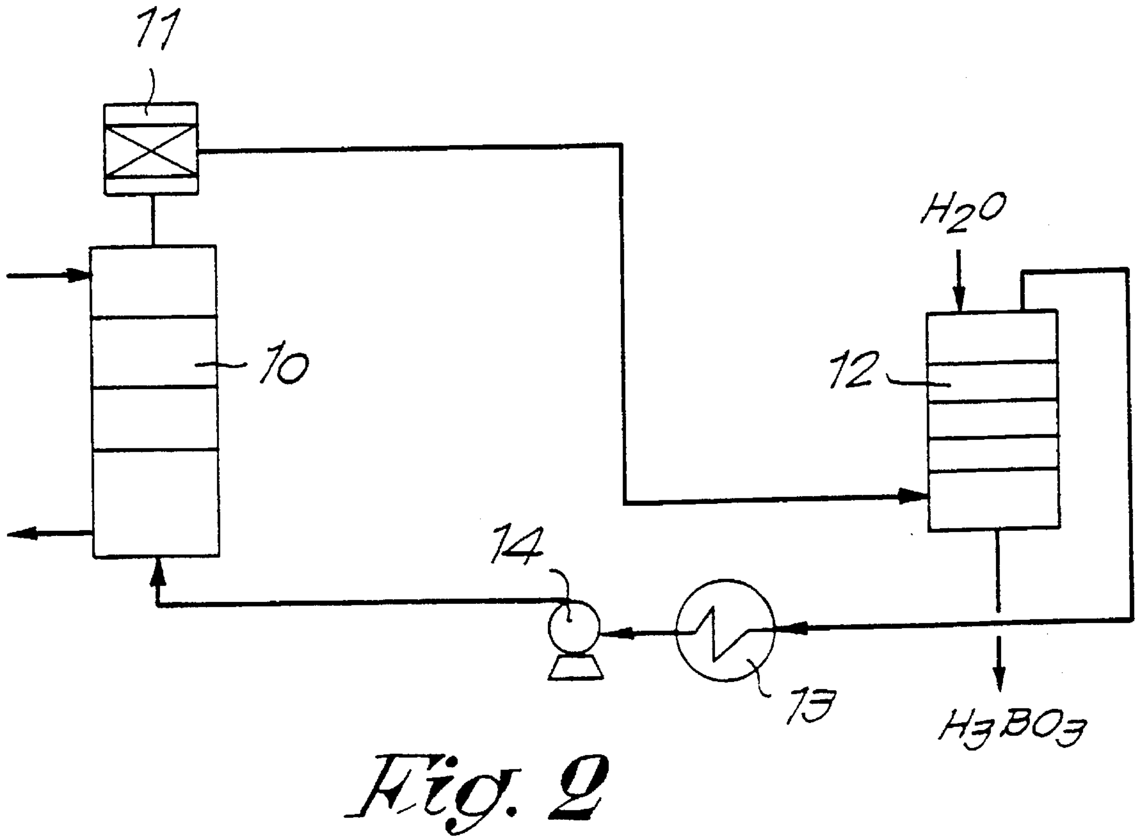
Fig. 2

METHOD FOR SEPARATING BORIC ACID

This application is a continuation of application Ser. No. 08/260,786, filed Jun. 16, 1994, which has now issued as U.S. Pat. No. 5,468,347.

The invention pertains to a method for separating boric acid from a liquid containing boric acids, especially the liquid waste of a nuclear power plant.

The primary water of a nuclear power plant of the type which uses water under pressure comes into direct contact with the nuclear fuel, and although it is very pure chemically, it does contain a few GBq of radionuclides per cubic meter of water. To regulate reactivity, up to 0.25% of boron is usually added to this water in the form of boric acid.

A fraction of this primary water is then contained in the waste water. A nuclear power plant produces annually thousands of cubic meters of slightly radioactive waste water containing boron which needs to be treated. This waste water is usually evaporated after a base has been added. Evaporation is generally considered to be the method which yields the highest decontamination factor, i.e. the vapor contains few if any radionuclides, with the exception of tritium. The remaining concentrates, which contain about 50% dry residue, are then embedded in concrete and stored in containers at suitable locations.

The high costs for the treatment of the concentrates and especially for the further storage are proportional to the volume thereof. For this reason, not only the decontamination factor, but also the volume factor, i.e. the ratio between the volume of waste water and the volume of concentrate, is very important.

Owing to crystallisation problems, the volume reduction factor during evaporation is likewise limited by the presence of boron, which constitutes the largest part of the dry residue in the form of boric acid or borate. Furthermore, the presence of boric acid may disturb the embedding of the waste in concrete. For this reason, the evaporation is carried out in an alkaline environment.

The removal of boric acid from the waste water would consequently lead to a higher volume reduction factor, and thus make it possible to reduce the volumes of waste to a greater degree. Furthermore, the boric acid could, if necessary, be added again to the primary water.

A selective ion-exchanger could be used to remove all the boric acid from the waste water, but this method is difficult to carry out on an industrial scale. The regeneration of the ion-exchanging resin and the recovery of the boric acid are particularly problematic.

Another method used is to evaporate the waste water, then to form volatile boric acid esters, such as trimethylborate and then proceed with distillation. Such a method is known from DD-A-293 219, whereby after evaporating the waste water, butyl alcohol is added to the concentrate, whereby the boric acid is estered, and then the volatile boric acid ester can be removed by distillation. These methods are difficult to conduct continuously and are also very time consuming. The alkaline process prior to evaporation, followed by re-acidification yield large quantities of salts and a large quantity of waste.

The purpose of this invention is to remedy these drawbacks and to create a method for the removal of boric acid from a liquid containing boric acid which is very simple and relatively economical, and particularly suited for industrial applications.

This objective is reached by feeding the liquid containing boric acid continuously to the reactor with a non-alkaline environment, and then by removing the boric acid by having it evaporated with steam which is continuously evacuated from the reactor after being enriched with boric acid.

This method is based on the fact that boric acid evaporates in steam and can thus be included in the steam.

The liquid is fed continuously and the steam, enriched with boric acid, is evacuated continuously, preferably so that the content of the reactor remains virtually constant. Thus, the reactor may be referred to as an evaporator since the boric acid evaporates in the steam to produce a boric acid enriched steam which is then evacuated.

The concentrate which remains in the reactor can be evacuated continuously, but is preferably evacuated discontinuously.

In a first embodiment of the invention, the liquid containing boric acid is added as a solution, and the steam is formed at least largely on location in the reactor by adding heat, so that the reactor functions as a vaporizer.

The non-volatile impurities will remain in the concentrate in the reactor. Because the boric acid content of the vapor phase is lower at the outset than that of the liquid, the boric acid will be first enriched in the concentrate, but with time, the boric content of the evacuated vapor will be as great as that of the liquid being fed. The boric acid content of the concentrate will not increase any more. The volume reduction factor is thus no longer limited by the presence of the boric acid in the waste water.

Steam can be used to feed heat to the reactor.

A part of this fed steam can thus take up and evacuate a part of the boric acid.

In a second embodiment of the invention, a concentrate is introduced in the reactor as boron containing liquid, and the steam for the evaporation of the boric acid is obtained, for the most part at least, from outside the reactor. The steam is then fed continuously from the outside into the reactor and is allowed to come into contact with the concentrate.

The advantage of this method is that it can use the vaporizer which is usually available in the existing devices for the evaporation of the boron-containing waste water in nuclear power plants. After the vaporizer which yields the concentrate, the reactor is assembled, which as a small volume must be treated, can also be small. Should the concentrate be alkaline, it can be made non-alkaline by adding acid.

In both embodiments, the pressure in the reactor is kept appropriately higher than atmospheric pressure and the temperature higher than 100° C.

The distribution coefficient, i.e. the ratio of the boric acid content of the vapor over the boric acid content of the liquid in the reactor increases as the temperature rises.

In both embodiments, the boric acid can be recovered from the boric acid containing vapor which is evacuated from the reactor in an economical way.

This can be done in a fractionating column.

The boric acid can also be washed from the boric acid containing vapor in a wash column.

In so far as the boric acid is recovered from the vapor and steam from outside of the reactor is used, this steam can be put to good use without condensing, by having it flow in a closed loop over the reactor and the plant to draw out the boric acid.

Other particular features and advantages of the invention will become clear from the following description of a method for separating boric acid from a liquid according to the invention. This description is given as an example only and does not restrict the invention in any way.

BRIEF DESCRIPTION OF THE DRAWINGS

FIG. 1 depicts a block diagram of a device for applying the method to remove boric acid according to the invention;

FIG. 2 is a block diagram similar to that of FIG. 1, but it refers to another embodiment of the invention.

DESCRIPTION OF THE PREFERRED EMBODIMENTS

The device depicted in FIG. 1 is used to separate boric acid from the low radioactive waste water of a nuclear power plant of the type which uses water under pressure, by applying the method of the invention, which consists chiefly of vaporising the waste water continuously under pressure in a reactor 1, which acts as a vaporizer, where a non-alkaline environment is present, from which vapor enriched with boric acid is continuously evacuated.

The waste water containing boric acid is pumped by means of a pump 2 through a filter 3 to a storage tank 4, and then to a heat exchanger 5 in the reactor 1. The vapor formed in the reactor 1 is evacuated continuously via a pressure-regulating valve 6 to a distillation column 7, where vapor is evacuated to a condenser 8 above and boric acid is evacuated below. This boric acid is reheated in a heat exchanger 9 and a part of it is fed again in the distillation column 7. A part of the condensate of the condenser 8 is brought back in the distillation column 7 but the largest part is fed to the above-mentioned heat exchanger 5 as primary liquid.

This method makes use of the observation that boric acid in the form of non bonded $H_3B0_3$ is evaporated in steam, whereby an experimental distribution coefficient D can be specified as the ratio of the mole fraction of boric acid in the vapor to the mole fraction of boric acid in the liquid.

Contrary to the usual methods, to evaporate boric acid, the waste water is made non-alkaline, making sure that the environment in the reactor is non-alkaline, i.e. acidic or virtually neutral. Normally, the waste water has the desired pH value, but if necessary, an acid such as sulphuric acid or a base can be fed to the storage tank 4 via the pipe 15. This method does not work properly if the pH value is too high; but too low a pH must also be avoided, because of the corrosion problems it entails. A suitable pH value for the waste water is between 5 and 7.5, and preferably between 6 and 7.

The distribution coefficient D is smaller than 1, but it increases with the temperature. At the atmospheric boiling point of about 100° C., D has a value of 0.0025, but at about 180° C. this value is already up to 0.03. To obtain temperatures higher than the atmospheric boiling point, the reactor i must be operated under pressure preferably—at temperatures between 150° and 180° C. and at pressures between 5.0 and 10.0 bar, for example at a temperature of 175° C. and a pressure of 7.6 bar. This pressure is obtained by the pump 2. To attain the above-mentioned temperature of about 180° C., a pressure of about 9.0 bar is required in the reactor 1.

A constant temperature and pressure and a constant volume of liquid are used in the reactor 1.

The waste water, already at a temperature of about 25° C., can be heated up to about 98° C., with the heat exchanger 5. Further heating occurs in the reactor 1 by the introduction of heat, which can be obtained in many different ways, for example by feeding overheated steam, the largest part of which is used to heat up and to vaporise the liquid in the reactor. A part of this heat can, if necessary, flow through the liquid, and then flow out of the reactor 1 together with the liquid, taking boric acid along with it.

When the device is started up, the boric acid content is lower in the vapor phase than in the liquid, as D, which determines the distribution of boric acid between the gaseous phase and the liquid, is smaller than one. The liquid in the reactor 1 will therefore be first enriched with boric acid and only a small part will be vaporised with the water. The boric acid content increases continuously with time in the vapor, and an equilibrium will be attained after a while; the boric acid content in the vapor will now be equal to the boric acid content in the added liquid, which is the waste water. The boric acid content of the concentrate will not increase further, and as a constant quantity of liquid is used in the reactor, all the boric acid introduced in the reactor with the waste water,will go into the gaseous phase, and be evacuated from the reactor 1.

The non-volatile and, among other elements, the radioactive impurities remain entirely behind in the concentrate in the reactor 1, which are then drained continuously, if required, but preferably from time to time, under the reactor 1. The increase of the concentration of these impurities is thus no longer limited by the boric acid concentration.

A very high volume reduction factor of the waste water is thus obtained, which is no longer limited by the presence of boric acid in the waste water.

The vapor which flows out of reactor 1 is released via the pressure regulating valve 6. In the distillation or fractionating column 7, which operates under atmospheric pressure, the evacuated vapor is separated into practically pure water vapor and a concentrated boric acid solution. The column 7 is set so that the boron concentration in the heat exchanger 9 is 7,500 ppm, being the concentration of the boric acid solution which is used for the production of the primary water of a nuclear power plant.

A wash column can be used instead of-a distillation or fractionating column to recover the boric acid from the vapor.

The device depicted in FIG. 2 is used to apply another embodiment of the method according to the invention. This embodiment differs from the first essentially in that the method is not applied on a relatively diluted boric acid solution, but on a concentrate. The steam needed to absorb and evacuate the evaporated boric acid can no longer be largely obtained through evaporation in a reactor; consequently, virtually all the necessary steam is added to the reactor 10, which in this case is a contactor, preferably a counterflow contact column.

The same temperature, pressure and pH conditions prevail in reactor 10 as in the first embodiment.

The concentrate is brought on top in the reactor 10, and allowed to flow in the counterflow with steam which is introduced from the bottom of the reactor 10 at high temperature and pressure. The concentrate, which is almost entirely boron-free and can be vaporised as much as desired, can be removed continuously or discontinuously from the reactor 10. The steam, enriched with evaporated boric acid, is evacuated from the top of the reactor 10, and then via a demister 11 to a wash column 12, where the boric acid is washed from the steam with water flowing at a low rate in the counterflow. This flow rate depends on the desired concentration of the recovered, purified boric acid.

The remaining steam which does not contain boric acid, is fed to a heat exchanger 13, where the heat losses are compensated, and finally, the pump 14 is used to pump the steam which now has a high temperature and pressure again to the reactor 10 to heat and vaporise the concentrate and to absorb the boric acid from it.

According to this embodiment, the current concentrates obtained by vaporising the waste water in the nuclear power plants can be split further into vaporised concentrates with little or no boron on the one hand, and a concentrated solution of boric acid on the other hand. No special vaporizer need be constructed. Only a device such as that depicted in FIG. 2 is needed, placed next to the existing vaporizer. As concentrates and thus very small flow rates are involved, the device can be very small in turn. The energy consumption is minimal, because steam is not condensed or released anywhere.

As a base is added in the vapors in use today, the pH of the concentrate can be higher than 8, in which case an acid such as sulphuric acid must be added until the pH value is brought under 8 and preferably under 7, before the concentrate is introduced in the reactor 10. A considerable amount of salts are formed which remain in the concentrate of the reactor 10.

The above-described methods manage to reduce the quantities of radioactive waste considerably. Moreover, boric acid can be recovered which can be used again.

This invention is in no way limited to the above-described embodiments; on the contrary, many changes can be made to these embodiments while still remaining within the scope of the patent application.

We claim:

1. A method for removing boric acid from water having boric acid dissolved therein which comprises introducing said water having boric acid dissolved therein into an evaporator wherein the temperature in the evaporator is more than 100° C. and the pressure in the evaporator is above atmospheric pressure; said water having a substantially neutral or acidic pH; heating said water to form steam whereby boric acid is removed from said water by transfer from said water to said steam so as to produce steam enriched with boric acid; removing said boric acid enriched steam from said evaporator and removing, from the evaporator, the water from which boric acid has been removed.

2. The method of claim 1 wherein said water having boric acid dissolved therein comprises liquid waste from a nuclear power plant.

3. The method of claim 1 wherein the water having boric acid dissolved therein is continuously fed into said evaporator and said boric acid enriched steam and said water from which boric acid has been removed are continuously removed from said evaporator so that the contents in the evaporator remain constant.

4. The method of claim 1 wherein the water from which boric acid has been removed is removed discontinuously from said evaporator.

5. The method of claim 1 which further includes the step of introducing steam into said evaporator.

6. The method of claim 1 wherein the temperature in the evaporator is between 150° C. and 180° C. and the pressure in said evaporator is 5 to 10 bar.

7. The method of claim 1 wherein the boric acid is recovered from the boric acid enriched steam after said steam is removed from said evaporator.

8. The method of claim 7 wherein the boric acid is recovered by passing the boric acid enriched steam through a distillation and fractionating column.

9. The method of claim 7 wherein the boric acid is recovered by passing the boric acid enriched steam through a wash column.

10. A method for removing boric acid from a liquid containing boric acid which comprises introducing a liquid containing boric acid into an evaporator wherein the temperature in the evaporator is more that 100° C. and the pressure in the evaporator is above atmospheric pressure; and liquid having a substantially neutral or acidic pH; introducing steam into said evaporator whereby boric acid is removed from said liquid by transfer from said liquid to said steam so as to produce steam enriched with boric acid; removing said boric acid enriched steam from said evaporator and removing, from the evaporator, the liquid from which boric acid has been removed.

11. The method of claim 10 wherein the liquid containing boric acid is continuously fed into said evaporator and said boric acid enriched steam and said liquid from which boric acid has been removed, are continuously removed from said evaporator so that the contents in the evaporator remain constant.

12. The method of claim 10 wherein the liquid from which boric acid has been removed is discontinuously removed from said evaporator.

13. The method of claim 10 wherein the temperature in the evaporator is between 150° C. and 180° C. and the pressure in said evaporator is 5 to 10 bar.

14. The method of claim 10 wherein the boric acid is recovered from the boric acid enriched steam after said steam is removed from said evaporator.

15. The method of claim 14 wherein the boric acid is recovered by passing the boric acid enriched steam through a distillation and fractionating column.

16. The method of claim 14 wherein the boric acid is recovered by passing the boric acid enriched steam through a wash column.

17. The method of claim 10 wherein the liquid containing boric acid is introduced into the top of the evaporator and flows downward through said evaporator and said steam is introduced into the bottom of said evaporator so that said steam rises through the evaporator in counterflow contact with said liquid containing boric acid whereby a boric acid enriched steam is formed; removing said boric acid enriched steam from the top of said evaporator; passing said boric acid enriched steam through a wash column for contact with liquid water whereby the boric acid is washed from said steam to produce steam having a reduced boric acid content; heating said steam having a reduced boric acid content and recirculating said heated steam to the bottom of said evaporator for counterflow contact with said aqueous boric acid solution.

* * * * *